(12) United States Patent
Kobayashi

(10) Patent No.: US 10,845,827 B2
(45) Date of Patent: Nov. 24, 2020

(54) FLOW COMPUTING APPARATUS

(71) Applicant: YOKOGAWA ELECTRIC CORPORATION, Tokyo (JP)

(72) Inventor: Toshiko Kobayashi, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 157 days.

(21) Appl. No.: 16/155,206

(22) Filed: Oct. 9, 2018

(65) Prior Publication Data

US 2019/0107850 A1    Apr. 11, 2019

(30) Foreign Application Priority Data

Oct. 10, 2017    (JP) .................. 2017-197017

(51) Int. Cl.
| | |
|---|---|
| G05D 7/06 | (2006.01) |
| G01F 3/20 | (2006.01) |
| G06F 9/448 | (2018.01) |
| G06F 9/38 | (2018.01) |
| G01F 1/40 | (2006.01) |
| G01F 15/02 | (2006.01) |
| G01F 15/00 | (2006.01) |
| G01F 25/00 | (2006.01) |
| G01F 1/84 | (2006.01) |
| G01F 1/42 | (2006.01) |

(52) U.S. Cl.
CPC .......... G05D 7/0647 (2013.01); G01F 1/40 (2013.01); G01F 3/20 (2013.01); G01F 15/005 (2013.01); G01F 15/022 (2013.01); G01F 25/0007 (2013.01); G06F 9/38 (2013.01); G06F 9/4494 (2018.02); G01F 1/42 (2013.01); G01F 1/8436 (2013.01)

(58) Field of Classification Search
CPC ................................. G05D 7/0647
See application file for complete search history.

(56) References Cited

U.S. PATENT DOCUMENTS

2017/0082469 A1    3/2017 Sai et al.

FOREIGN PATENT DOCUMENTS

| JP | H11132828 A | 5/1999 |
|---|---|---|
| JP | 2004191072 A | 7/2004 |

OTHER PUBLICATIONS

American Petroleum Institute; "Manual of Petroleum Measurement Standards", Chapter 21—Flow Measurement Using Electronic Metering Systems, Section 1—Electronic Gas Measurement, pp. 1-38; Reaffirmed Jul. 2005 (48 pages).

(Continued)

*Primary Examiner* — Tejal Gami
(74) *Attorney, Agent, or Firm* — Osha Bergman Watanabe & Burton LLP

(57) ABSTRACT

A flow computing apparatus includes: a first computation controller; a second computation controller; and an access controller, wherein the first computation controller: computes a flow rate of a fluid from sensor data indicating a state of the fluid; and generates transaction information indicating the flow rate of the fluid, the second computation controller computes a management index related to supply of the fluid based on at least a part of the sensor data or index values computed during the computation of the flow rate of the fluid by the first computation controller, and the access controller restricts at least a change in a function of the first computation controller.

8 Claims, 4 Drawing Sheets

(56) References Cited

OTHER PUBLICATIONS

American Petroleum Institute; "Manual of Petroleum Measurement Standards"; Chapter 20—Allocation Measurement, Section 1—Allocation Measurement, pp. 1-64; Reaffirmed Sep. 2011 (76 pages).

FLOW COMPUTING APPARATUS

CROSS-REFERENCE TO RELATED APPLICATION

This application claims priority from Japanese Patent Application No. 2017-197017 filed with the Japan Patent Office on Oct. 10, 2017, the entire content of which is hereby incorporated by reference.

BACKGROUND

1. Technical Field

The present invention relates to a flow computing apparatus.

2. Description of the Related Art

A flow computing apparatus for a fluid such as a liquid or a gas is used to manage and trade the flow rate of a fluid to be acquired. The flow computing apparatus is installed as an instrumentation for calculating the flow rate of a fluid produced from a production well such as an oil well or gas well. Flow computing apparatuses for oil and gas are classified into "flow computers" and "allocation metering." The point of having the function of correcting temperature and pressure for a sensor output (a flow rate, pressure, or temperature) installed in a production well and calculating the value of a basic flow rate in a base condition (base condition) is common to flow computing apparatuses of both classifications. The basic flow rate includes an integrated flow rate and an average flow rate per predetermined period.

However, the main purpose of "flow computers" is the computation of a flow rate being a basis of the calculation of a transaction price. "Flow computers" need to satisfy predetermined requirements in addition to the function of computing a basic flow rate of a fluid. The requirements contain including the function of acquiring an audit trail (Audit Trail) required for a transaction, the reporting function, and the security function. Depending on the countries, a certification of the satisfaction of these requirements issued by the authority may be required. The requirements of "flow computers" are described in, for example, "Manual of Petroleum Measurement Standards, Chapter 21—Flow Measurement Using Electronic Metering Systems, Section 1—Electronic Gas Measurement, American Petroleum Institute, REAFFIRMED, July 2005, pp. 1-38 (hereinafter referred to as Manual 1)". Requirements for each of a gas and a liquid are described in Chapters 21.1 and 21.2 in the document. This is for eliminating the influence of the other functions of the flow computing apparatus and securing the stability and security of a transaction.

The purposes of "allocation metering" are to acquire a management index of a fluid to be acquired, manage the flow rate, and control the flow rate. The purposes are not necessarily limited to the computation of a basic flow rate. "Allocation metering" does not require a certificate for transactions unlike "flow computers." Hence, the functions of "allocation metering" and the other specifications have a higher degree of freedom than "flow computers." "Allocation metering" can control and compute, for example, the production volume of a fluid from a production well, the acquisition of various asset management indices, the switching of a production well of a production source, or the adjustment of the degree of opening of a valve installed in the production well, in addition to the computation of a basic flow rate. Examples of representative management indices include a net oil (Net Oil) in the produced water oil turbid solution. The specifications of "allocation metering" are described in, for example, "Manual of Petroleum Measurement Standards, Chapter 20—Allocation Measurement, Section 1—allocation Measurement, American Petroleum Institute, REAFFIRMED, September 2011, pp. 1-64 (hereinafter referred to as Manual 2)." In "allocation metering," a "flow computer" is not necessarily installed when the management index is acquired without requiring information on fluid transactions.

SUMMARY

A flow computing apparatus according to one or more embodiments of the present invention is provided with a first computation task; a second computation task; and an access controller. The first computation task includes a flow rate computer configured to compute a flow rate of a fluid from sensor data indicating a state of the fluid, and a transaction information generator configured to generate transaction information indicating the flow rate of the fluid. The second computation task includes a management index computer configured to compute a management index related to supply of the fluid on the basis of at least a part of the sensor data or index values computed during the course of the computation by the flow rate computer, and the access controller is configured to restrict at least a change in a function of the first computation task.

DETAILED DESCRIPTION OF EMBODIMENTS

Figure 1:
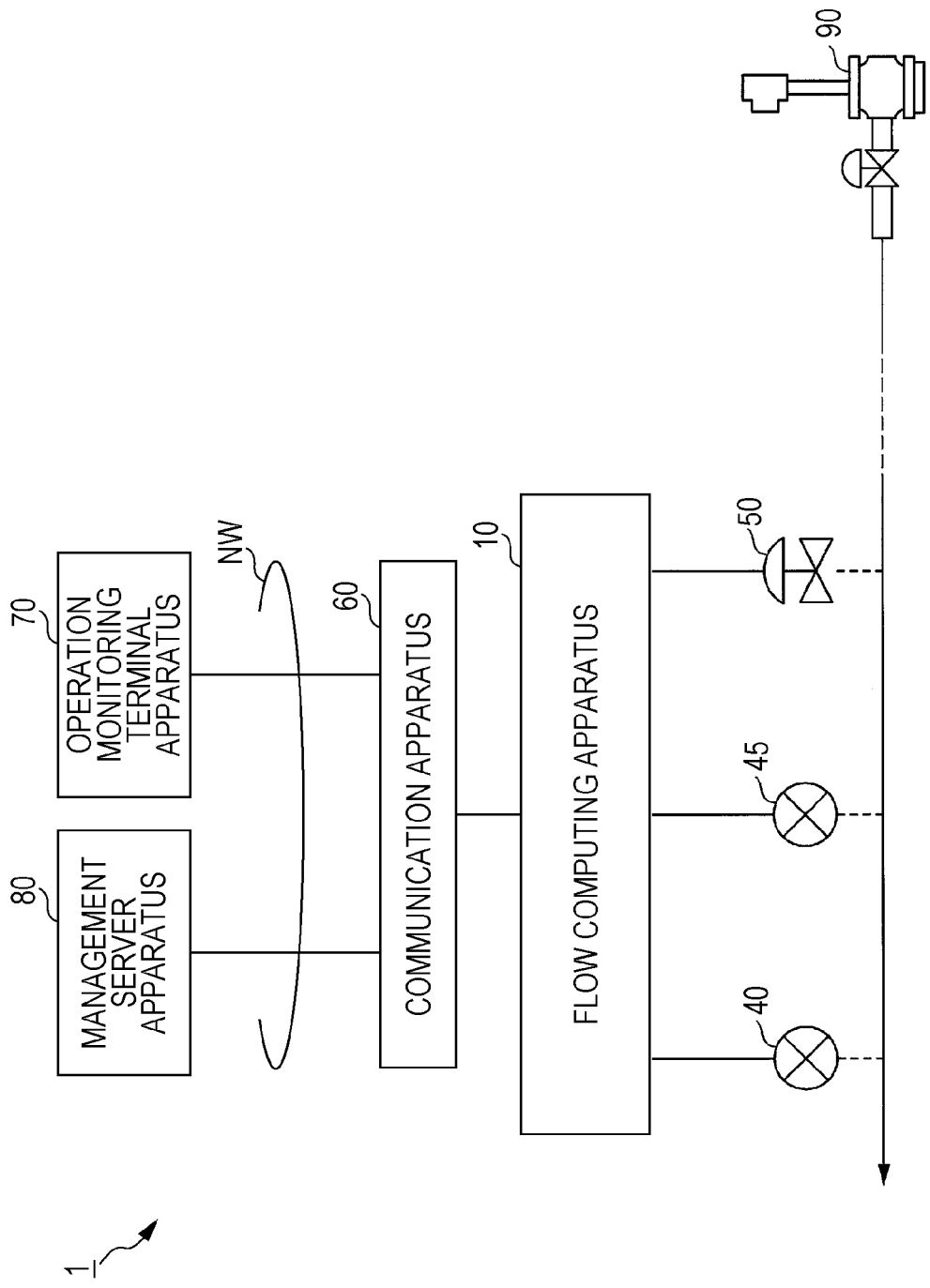
FIG. 1 is a diagram illustrating an example of a flow management system according to one or more embodiments of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, "allocation metering" has recently become important with increasing number of nonconventional production wells and the aging of conventional production wells. A typical example of the nonconventional production well is a shale gas production well. A large volume of water (fracturing water) is ejected into shale (shale) in a geological formation to fracture shale with water pressure. Accordingly, the shale gas production well produces gas trapped in the shale. Hence, the volume of produced water discharged onto the surface during the production of gas is larger than the conventional production well. Hence, the management of the volume of produced water is increasingly important. Moreover, the flowing pressure of a fluid is reduced with aging in a conventional production well. In order to increase pressure in such a production well, water is injected into the production well by enhanced oil recovery (Enhanced Oil Recovery). Also in such a case, the volume of produced water discharged onto the surface increases.

Figure 5:
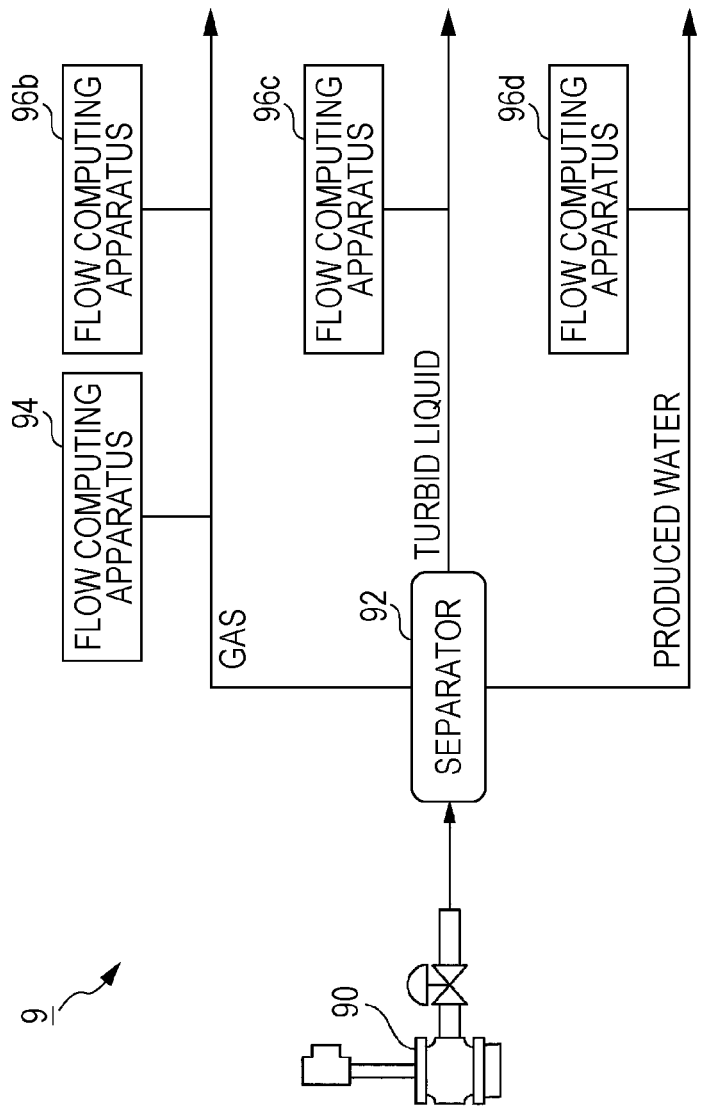
FIG. 5 is a diagram illustrating an example of a flow management system according to one or more embodiments of the present invention.

Hence, a plurality of flow computing apparatuses is generally installed in the production well according to the purposes or products. Especially, the number of cases where both of a "flow computer" and "allocation metering" are installed is increasing. In an example illustrated in FIG. 5, a flow computing apparatus 94 corresponds to a "flow computer." Each of flow computing apparatuses 96b, 96c, and 96d corresponds to "allocation metering." The flow computing apparatus 94 calculates the flow rate of a gas separated by a separator 92 from a mixture produced from a production well 90. Separately from this, the flow computing apparatuses 96b, 96c, and 96d calculate management indices related to the separated gas, turbid liquid, and produced water. In this manner, the installation of many flow computing apparatuses leads to an increase in installation costs. More specifically, the configuration of a network for transmitting and receiving various types of data such as computation data and sensor output data among the apparatuses is complicated. In addition, it is necessary to synchronize data among the apparatuses in some cases. Specifications of, for example, the input/output of control parameters generally vary among the apparatuses. Hence, a user operation is complicated. Furthermore, a basic flow rate is redundantly computed among the apparatuses, which is likely to make the entire system inefficient. Moreover, a predetermined system for computing a basic flow rate may require an update of a parameter related to the computation of a flow rate. In this case, each apparatus requires work in accordance with the update.

One or more embodiments of the present invention provide a flow computing apparatus that can satisfy requirements for fluid transactions and compute a management index, considering the above points.

(1) A flow computing apparatus according to one or more embodiments of the present invention is developed in view of above-described circumstances. That is, a flow computing apparatus according to one or more embodiments is provided with a first computation task; a second computation task; and an access controller. The first computation task includes a flow rate computer configured to compute a flow rate of a fluid from sensor data indicating a state of the fluid, and a transaction information generator configured to generate transaction information indicating the flow rate of the fluid. The second computation task includes a management index computer configured to compute a management index related to supply of the fluid on the basis of at least a part of the sensor data or index values computed during the course of the computation by the flow rate computer, and the access controller is configured to restrict at least a change in a function of the first computation task.

(2) A flow computing apparatus according to one or more embodiments is the flow computing apparatus described above, in which the access controller is configured to restrict a change in setting information on the computation of the flow rate of the fluid on the basis of an operation of an authenticated user, and restrict a change in a program for causing the first computation task to execute a process.

(3) A flow computing apparatus according to one or more embodiments is the above-mentioned flow computing apparatus provided with a door covering a surface of a housing; and an operating device inside the housing. The door is capable of mounting thereon a closure that restricts opening of the door, and the access controller is configured to permit a change in the program upon detecting an operation on the operating device.

(4) A flow computing apparatus according to one or more embodiments is the above-mentioned flow computing apparatus, in which the transaction information generator is configured to generate an update record of the setting information on the computation of the flow rate upon the setting information being updated.

(5) A flow computing apparatus according to one or more embodiments is the above-mentioned flow computing apparatus provided with a setting monitor configured to present a setting screen having a common display format to a setting screen of the setting information on the computation of the flow rate, and determine setting information on the computation of the management index.

(6) A flow computing apparatus according to one or more embodiments is the above-mentioned flow computing apparatus, in which the setting monitor is configured to edit a program for causing the second computation task to make a computation in accordance with an operation of the authenticated user.

(7) A flow computing apparatus according to one or more embodiments is the above-mentioned flow computing apparatus in which the second computation task includes a process controller configured to compute an operation amount of a process related to the supply of the fluid on the basis of at least a part of the sensor data.

(8) A flow computing apparatus according to one or more embodiments is the above-mentioned flow computing apparatus is provided with a transmitter configured to transmit the flow rate of the fluid and the management index to a common transmission destination.

According to one or more embodiments of the present invention, it is possible to provide a flow computing apparatus that can satisfy requirements for fluid transactions and compute a management index. Hence, the number of apparatuses installed on a fluid production or commercial site can be reduced. Therefore, the maintenance efficiency of flow management is improved.

Embodiments of a flow computing apparatus are described hereinafter with reference to the drawings.

Firstly, an example of the configuration of a flow management system according to one or more embodiments is described.

FIG. 1 is a block diagram illustrating an example of the configuration of a flow management system 1 according to one or more embodiments.

The flow management system 1 includes a flow computing apparatus 10, two types of sensors 40 and 45, an actuator 50, a communication apparatus 60, an operation monitoring terminal apparatus 70, and a management server apparatus 80.

As illustrated in FIG. 1, each device included in the flow management system 1 may be a single device. Alternatively, an apparatus configured by integrally combining a plurality of devices of them, or all the devices, may be included. For example, the flow management system 1 may be realized as a single apparatus including all of the flow computing apparatus 10, the sensors 40 and 45, the actuator 50, the communication apparatus 60, the operation monitoring terminal apparatus 70, and the management server apparatus 80, which are housed in one housing. In this case, the plurality of devices integrated can be connected in such a manner as to be capable of transmitting and receiving data. Consequently, these devices are not necessarily connected via a network NW. Moreover, these devices may be directly connected by, for example, a bus (base line) or lead. In the following description, an example of the flow computing apparatus is described which mainly includes, as a single device, each of the flow computing apparatus 10, the sensors 40 and 45, the actuator 50, the communication apparatus 60, the operation monitoring terminal apparatus 70, and the management server apparatus 80.

The flow computing apparatus 10 includes a general-purpose computing device as hardware. The flow computing apparatus 10 is configured as a PLC (Programmable Logic Controller). The flow computing apparatus 10 functions as a flow computer and allocation metering through software. Hence, the computing device executes processes to be instructed by commands described in various control programs. In the following description, to execute a process to be instructed by a command described in a program may be simply referred to as "to execute a program."

The flow computing apparatus 10 has, as the flow computer, the function of computing the flow rate of a fluid from sensor data indicating the state of the fluid, and the function of generating transaction information indicating the flow rate of the fluid. Furthermore, the flow computing apparatus 10 has, as the allocation metering, the function of computing a management index related to the supply of the fluid on the basis of at least one of sensor data and the flow rate obtained by the computation. The flow computing apparatus 10 at least restricts changes in the functions of the flow computer.

The sensor data inputted into the flow computing apparatus 10 includes sensor data inputted from the sensor 40 (hereinafter referred to as the "sensor data A") and sensor data inputted from the sensor 45 (hereinafter referred to as the "sensor data B"). In the computation of a flow rate, the sensor data A is used as an input value. The sensor data A includes temperature and pressure per predetermined time (for example, one second). In computations of the management index and other values, the input values to be used vary according to the values. The sensor data A or B is, or both of them are, used according to the value.

The sensor 40 is a detector that detects a predetermined physical quantity indicating the state of a fluid. The sensor 40 is installed in a pipe through which the fluid flows. The physical quantity detected is used to compute a basic flow rate. Hence, the sensor 40 requires a predetermined certificate of the authority. For example, in the United States, the requirements described in Manual 1 need to be satisfied. The physical quantity targeted for detection may vary according to the principle of the detection of the flow rate of a fluid. The sensor 40 includes a flow meter to measure a mass flow rate. For example, if the flow meter is an orifice flow meter, the flow meter detects pressures upstream and downstream of the orifice. The orifice is also called a throttle valve. The pressures upstream and downstream of the orifice are a surface facing the flow of a fluid and a surface ahead in the direction of the flow, respectively. The mass flow rate is proportional to the square root of a differential pressure (differential pressure). The differential pressure is a pressure difference across the orifice. If the flow meter is a Coriolis flow meter, the flow meter detects a phase difference in vibration between its two arms. The two arms share an inlet and an outlet of the fluid. In other words, a fluid targeted for measurement passes through each of these two arms. The phase difference to be detected is proportional to the flow rate.

The sensor 40 further includes a temperature sensor and a pressure sensor. The measured production temperature and production pressure are used to correct the measured flow rate. The production pressure and the production temperature indicate the pressure and temperature of the fluid produced from the production well 90, respectively. The sensor 40 outputs the sensor data A indicating the detected physical quantities to the flow computing apparatus 10.

The sensor 45 is a detector that detects a predetermined physical quantity indicating the state of a fluid. The detected physical quantity is used for a management index computation or control computation. This physical quantity is not used for the computation of a fluid flow rate for the purpose of a transaction. Hence, a certificate is not required for the sensor 45. The physical quantity as a detection target is used for the management index computation or process control. Hence, the physical quantity as the detection target varies according to the computed value. The sensor 45 outputs the sensor data B indicating the detected physical quantity to the flow computing apparatus 10. When neither the management index computation nor the process control requires a physical quantity detected separately from the physical quantities detected by the sensor 40, the sensor 45 may be omitted.

The actuator 50 is a mechanical element that adjusts the flow rate of a fluid to be acquired, on the basis of a control signal inputted from the flow computing apparatus 10. The actuator 50 includes, for example, a valve (valve) provided to a pipe through which a fluid targeted to detect a flow rate passes. In this case, the actuator 50 controls the degree of opening of the valve to the degree of opening corresponding to an operation amount indicated by control data inputted. The flow management system 1 is not necessarily provided with the actuator 50.

The communication apparatus 60 is connected to the flow computing apparatus 10 and the network NW in such a manner as to be capable of transmitting and receiving various types of data. The network NW for transmitting and receiving various types of data inputted into and outputted from the flow computing apparatus 10 is connected to the operation monitoring terminal apparatus 70 or the management server apparatus 80. Consequently, the communication apparatus 60 relays the transmission and receipt of data between the flow computing apparatus 10, and the operation monitoring terminal apparatus 70 or the management server apparatus 80. The communication apparatus 60 is, for example, a relay apparatus for a network router or gateway.

The operation monitoring terminal apparatus 70 has an operation monitoring function and an engineering support function. The operation monitoring function allows the operation monitoring terminal apparatus 70 to remotely notify an operator of the behavior of the sensor 40, the sensor 45, the actuator 50, and the flow computing apparatus 10 via the network NW and the communication apparatus 60. Moreover, the engineering support function allows the operation monitoring terminal apparatus 70 to support engineering for the flow computing apparatus 10. The operation monitoring terminal apparatus 70 includes, for example, a display (display) that displays a screen based on various types of screen data received from the flow computing apparatus 10. Moreover, the operation monitoring terminal apparatus 70 includes an operating device. The operating device detects an operation input, and generates an operation signal in accordance with the detected operation input. The operation signal includes an operation signal for transmitting various commands (commands) and an operation signal for displaying parameters used to compute a flow rate, a management index, and other index values in an input field on the screen. The operating device may be a general-purpose member such as a mouse, a keyboard, or a touch sensor. Moreover, the operating device may be a dedicated member such as a button or knob. The operation monitoring terminal apparatus 70 transmits the operation signal generated in accordance with the operation input, to the flow computing apparatus 10.

The operation monitoring function allows, for example, the display to display the operating statuses of monitoring target devices such as the sensor 40, the sensor 45, the actuator 50, and the flow computing apparatus 10. Hence, the operation monitoring terminal apparatus 70 receives an operating status signal indicating the operating status transmitted from each of the monitoring target devices.

The operation monitoring function, the engineering support function, or both functions may allow the display to display an index value of, for example, a flow rate or a management index.

The engineering support function may include a parameter setting function, an application editing function, or both of them. Computation parameters used to calculate an index value of each of a flow rate, a management index, and the like can be set on a parameter setting screen. The parameter setting screen may be, for example, configured in such a manner as to correspond to each index value. Moreover, the parameter setting screen may include an application editing screen for editing an application program (hereinafter referred to as the "application") for causing a second computation task 16 of the flow computing apparatus 10 to execute.

For example, the operation monitoring terminal apparatus 70 may execute a predetermined application program on general-purpose hardware such as a personal computer (PC) to realize the functions. Alternatively, the operation monitoring terminal apparatus 70 may be dedicated hardware.

The operation monitoring terminal apparatus 70 may be connected to the communication apparatus 60 in such a manner as to be capable of transmitting and receiving various types of data to and from the flow computing apparatus 10 not via the network NW.

The operation monitoring terminal apparatus 70 does not necessarily include both of the engineering function and the operation monitoring terminal function. For example, the operation monitoring terminal apparatus 70 may be a terminal apparatus dedicated for the operation monitoring function without including the engineering support function. In this case, the flow management system 1 may further include an engineering support terminal with the engineering support function.

The management server apparatus 80 accumulates flow rate data, management index data, and transaction data, which have been acquired from the flow computing apparatus 10 via the communication apparatus 60 and the network NW. The flow rate data is data indicating the flow rate calculated per predetermined time (for example, hourly or daily). The management index data is data indicating the management index calculated per predetermined time. The transaction information is information on a transaction of the fluid. A transaction mainly indicates a sale. The transaction information includes information for corroborating a ground and validity of value paid for the provision of the fluid. More specifically, examples of the transaction information include a flow rate transaction record and audit trail information.

The flow rate transaction record is, for example, information indicating a flow rate per predetermined period. The flow rate corresponds to a transaction amount for a destination to provide the fluid. Examples of the audit trail information include a setting log, an event log, and a test record. The setting log includes information indicating parameters for calculating the flow rate set at that point in time. The event log is information indicating a record of events that can influence transactions. Examples of such events include parameters for calculating index values, setting and change of a system targeted for measurement, and a sudden change in measurement value. The test record is information indicating a test result of the sensor 40 based on a predetermined procedure. The test record may include, for example, information indicating measurement values from the sensor 40 at predetermined temperature or pressure. The management server apparatus 80 includes an operating input device that accepts a user operation input. When the operation signal indicating a request for the transaction information is inputted into the management server apparatus 80, the management server apparatus 80 transmits a transaction information request to the flow computing apparatus 10 via the network NW. The management server apparatus 80 receives the transaction information from the flow computing apparatus 10 as a response to the transaction information request.

(Flow Computing Apparatus)

Next, an example of the functional configuration of the flow computing apparatus 10 according to one or more embodiments is described.

Figure 2:
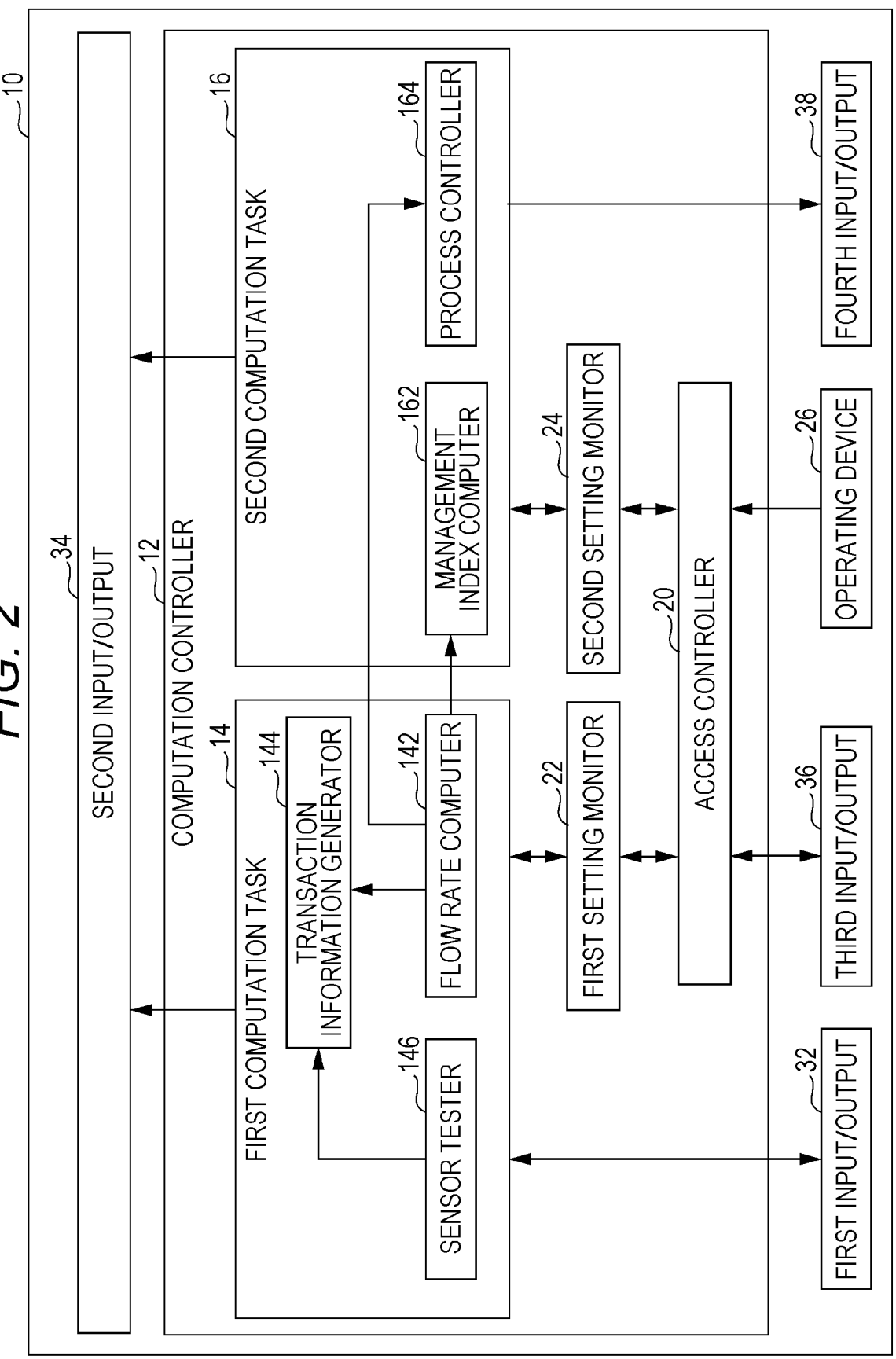
FIG. 2 is a block diagram illustrating an example of the functional configuration of a flow computing apparatus according to one or more embodiments of the present invention.

FIG. 2 is a block diagram illustrating an example of the functional configuration of the flow computing apparatus 10 according to one or more embodiments.

The flow computing apparatus 10 includes a computation controller 12, an operating device 26, a first input/output 32, a second input/output 34, a third input/output 36, and a fourth input/output 38.

The computation controller 12 includes a first computation task (first computation controller) 14, the second computation task (second computation controller) 16, an access controller 20, a first setting monitor 22, and a second setting monitor 24. Hardware included in the computation controller 12 includes a computing device such as a CPU (Central Processing Unit). The computing device reads a predetermined control program from a recording medium, and executes the control program read out. In this manner, the functions of the access controller 20, the first setting monitor 22, the second setting monitor 24, the first computation task 14, and the second computation task 16 are realized by the computing device.

The first computation task 14 includes a flow rate computer 142, a transaction information generator 144, and a sensor tester 146.

The flow rate computer 142 computes a basic flow rate on the basis of the measurement values indicated by the sensor data A inputted from the sensor 40 via the first input/output 32. The method for computing a basic flow rate is described in Manual 1. The flow rate computer 142 calculates a flow rate per predetermined integrated time (for example, hourly or daily) (hereinafter referred to as the "accumulated flow rate") on the basis of measurement values measured per predetermined unit time (for example, every second), and set parameters. The measurement values include the mass flow rate, production temperature, and production pressure of a fluid. Hence, the flow rate computer 142 calculates, for example, compressibility and density as physical coefficients of the fluid per unit time on the basis of the mass flow rate, production pressure, and production temperature. The flow rate computer 142 divides the mass flow rate per unit time by the calculated density to calculate a volumetric flow rate. Moreover, the flow rate computer 142 corrects the volumetric flow rate calculated per unit time on the basis of the compressibility, the production temperature, and the production pressure (temperature-pressure correction). The flow rate computer 142 accumulates the corrected volumetric flow rates within the integrated time, and calculates them as the accumulated flow rate. The flow rate computer 142 then outputs the accumulated flow rate calculated per integrated time to the transaction information generator 144. The flow rate computer 142 outputs the accumulated flow rate, the measurement values used to calculate the accumulated flow rate, or the index value (for example, the compressibility or density) calculated during the course of calculating the accumulated flow rate), or any combination thereof, as flow computation information, to the second computation task 16.

For example, a measurement value query signal is inputted from the first setting monitor 22 into the first computation task 14. At this point in time, the flow rate computer 142 may output the latest measurement values inputted into itself to the first setting monitor 22.

Alternatively, a flow query signal is inputted from the first setting monitor 22 into the first computation task 14. At this point in time, the flow rate computer 142 may output the latest calculated accumulated flow rate to the first setting monitor 22.

A parameter set including a plurality of parameters may be preset in the flow rate computer 142. The plurality of parameters is used to calculate an accumulated flow rate and an index value calculated during the course of calculating the accumulated flow rate. The flow rate computer 142 outputs the set parameter set to the transaction information generator 144.

For example, a parameter query signal is inputted from the first setting monitor 22 into the first computation task 14. At this point in time, the flow rate computer 142 outputs the parameter set set therein at this point in time to the first setting monitor 22. Alternatively, a parameter setting signal is inputted from the first setting monitor 22 into the first computation task 14. At this point in time, the flow rate computer 142 changes current values of the parameters instructed by the parameter setting signal to setting values of the instructed parameter. The flow rate computer 142 outputs, to the first setting monitor 22, parameter change information indicating the changed date and time, parameters, and post-change setting values.

The flow rate computer 142 may detect an abnormal value of a temporal change in measurement values per unit time. The flow rate computer 142 determines whether or not each element of measurement values, that is, each of the mass flow rate, the production temperature, and the production pressure is above its upper limit or below its lower limit. The upper and lower limits of each element of the measurement values can be preset in the flow rate computer 142. If there is an element of a measurement value above the upper limit, or an element of a measurement value below the lower value, the flow rate computer 142 outputs, to the transaction information generator 144, abnormal value information indicating the date and time and the measurement value. The abnormal value information may be outputted to the first setting monitor 22. If all the elements of the measurement values fall within ranges between their lower and upper limits, the flow rate computer 142 may not output the abnormal value information.

The flow rate computer 142 inputs the accumulated flow rate per integrated time into the transaction information generator 144. The transaction information generator 144 generates transaction information on the fluid. In other words, the transaction information generator 144 generates a flow rate transaction record indicating the accumulated flow rate.

Here, the transaction information generator 144 holds, as a setting log, the parameter set inputted from the flow rate computer 142. The transaction information generator 144 may change a current value of the parameter indicated by the parameter change information inputted from the flow rate computer 142 to a setting value indicated by the parameter change information. Consequently, the latest parameter set is held in the setting log.

Moreover, the parameter change information and the abnormal value information, which are successively inputted from the flow rate computer 142, are accumulated in the transaction information generator 144. The transaction information generator 144 generates an event log from the accumulated information.

Furthermore, sensor test information and sensor adjustment information, which are inputted from the sensor tester 146, are accumulated in the transaction information generator 144. The transaction information generator 144 generates a test record from the accumulated information.

Each of the generated flow rate transaction record, event log, and test record forms a part of the transaction information.

The transaction information generator 144 transmits a part or all of the generated transaction information to the management server apparatus 80 via the second input/output 34. The transaction information generator 144 may transmit the transaction information at predetermined transmission intervals (for example, daily). Alternatively, when the transaction information generator 144 receives a transaction information request from the management server apparatus 80, the transaction information generator 144 may transmit the transaction information that has been generated up to this point in time. If the transaction information request specifies a period, the transaction information generator 144 transmits, to the management server apparatus 80, a part including a date and time in the transaction information within the specified period. Furthermore, the transaction information request may specify information, that is, any of the flow rate transaction record, the event log, and the test record. In this case, the transaction information corresponding to the specified information may be transmitted to the management server apparatus 80.

The sensor tester 146 performs a test on the sensor 40 and outputs sensor test information indicating the test result to the transaction information generator 144. For example, a test request is inputted from the first setting monitor 22 into the first computation task 14. At this point in time, the sensor tester 146 determines whether or not an element value of a measurement value is within a range of a predetermined reference value. The element value of the measurement value is inputted from the sensor 40 into the first computation task 14 via the first input/output 32. The element of the measurement value is, for example, the mass flow rate, the production temperature, or the production pressure. When an element value of a certain measurement value is determined to be within a range of its reference value, the sensor tester 146 determines that the element value passes. On the other hand, when the element value is determined to be outside the range of the reference value, the sensor tester 146 determines that the element value fails. The determination result, pass or failure, of the element value by the sensor tester 146 is included in the test result. The test result may include the element value in addition to the determination result.

The sensor tester 146 may calibrate the sensor 40 to handle the element value determined as fail. Upon calibration, the sensor tester 146 outputs an adjustment signal that instructs an adjustment to the sensor 40 via the first input/output 32 in such a manner that the element value falls within a range of its reference value. When the sensor tester 146 inputs the adjustment signal into the sensor 40, the sensor 40 adjusts a parameter related to a measurement of the element value instructed by the adjustment signal. In other words, the adjustment of the parameter allows the sensor 40 to cause the element value to fall within the range of the predetermined reference value. The sensor 40 then outputs an adjustment complete signal indicating the completion of the adjustment to the flow computing apparatus 10.

The sensor 40 inputs the adjustment complete signal indicating the completion of the adjustment into the flow computing apparatus 10. At this point in time, the sensor tester 146 outputs, to the transaction information generator 144, sensor adjustment information indicating the data and time, and the element value of the adjustment target.

The second computation task 16 includes a management index computer 162 and a process controller 164.

The management index computer 162 calculates a predetermined management index related to the supply of a fluid on the basis of the flow computation information inputted from the flow rate computer 142. The management index includes, for example, the above-mentioned net oil. For example, a method described in Manual 2 can be used as a method for calculating a management index.

The management index computer 162 may calculate, as the gas flow rate, the total volume of components that are in gaseous form at room temperature (for example, 10 to 30° C. and atmospheric pressure (for example, 105 Pa) among calculation target components. Moreover, the management index computer 162 may calculate the total volume of calculation target components as a net oil. The management index computer 162 generates management index information indicating the date and time as of this point in time, and the calculated component composition, gas flow rate, or net oil, or any combination thereof. The management index computer 162 transmits the generated management index information to the management server apparatus 80 via the second input/output 34. The management index computer 162 may transmit the management index information at predetermined transmission intervals. Alternatively, the flow computing apparatus 10 receives a management index information request from the management server apparatus 80. At this point in time, the management index information that has been generated by the management index computer 162 up to this point in time may be transmitted. If the management index information request specifies a period, the management index computer 162 transmits, to the management server apparatus 80, a part including the date and time in the transaction information within the specified period. Furthermore, the management index information request may specify information, that is, any of the component composition, the gas flow rate, and the net oil. In this case, the management index information corresponding to the specified information may be transmitted to the management server apparatus 80.

Depending on the management index targeted for calculation, the management index computer 162 may calculate the management index using the measurement values inputted from the sensor 45 via the first input/output 32. This is because a transaction restriction is not imposed on the computation of the management index.

For example, a parameter query signal is inputted from the second setting monitor 24 into the second computation task 16. At this point in time, the management index computer 162 outputs, to the second setting monitor 24, the parameters set therein as of this point in time. Alternatively, a parameter setting signal is inputted from the second setting monitor 24 into the second computation task 16. At this point in time, the management index computer 162 changes current values of the parameters instructed by the parameter setting signal to setting values of the instructed parameters.

Furthermore, a management index query signal is inputted from the second setting monitor 24 into the second computation task 16. At this point in time, the management index computer 162 may output the latest calculated management index to the second setting monitor 24.

The process controller 164 controls a process related to the supply of a fluid. Examples of such control include control over the switching of the production well 90 (hereinafter referred to as the "switching control"), control over the flow rate of a fluid produced from the production well 90 (hereinafter referred to as the "flow control"), and control over emergency shutdown of the fluid from the production well 90 (hereinafter referred to as the "emergency shutdown control").

In the switching control, the process controller 164 outputs a switching control signal inputted from the second setting monitor 24 into the second computation task 16, to the actuator 50 via the fourth input/output 38. In this case, the actuator 50 as an output destination of the switching control signal is a selector (not illustrated) that switches the production well 90 that supplies the fluid among a plurality of the production wells 90. The switching control signal is inputted from the process controller 164 into the selector. The selector then closes a valve of a pipe installed in the production well 90, the valve having been open up to that point of time, and opens a valve of a pipe installed in the production well 90, the valve being instructed by the switching control signal.

In the flow control, the process controller 164 controls, for example, the volume of injection water that is injected into the production well 90. Hence, the process controller 164 controls the degree of opening of a valve (not illustrated) of a pipe for flowing the injection water installed in the production well 90 in such a manner as to maintain the mass flow rate indicated by the flow computation information inputted from the flow rate computer 142 into the process controller 164 at a preset target mass flow rate. The process controller 164 performs, for example, a control computation for PID control with a mass flow rate and a target mass flow rate, respectively, as an input value and a target value, and calculates the degree of opening of the valve as the operation amount. The process controller 164 outputs an opening degree signal indicating the calculated degree of opening to the actuator 50 via the fourth input/output 38. In this case, the actuator 50 as the output destination of the opening degree signal is a valve of a pipe for supplying the injection water as of this point in time. The degree of opening of a flow passage of the valve is set at the degree of opening indicated by the opening degree signal inputted from the process controller 164 into the valve.

For example, when the mass flow rate indicated by the flow computation information inputted from the flow rate computer 142 exceeds a preset upper limit of the mass flow rate, the emergency shutdown control works. At this point in time, the process controller 164 closes a valve of a pipe installed in the production well 90, the valve having been open up to that point in time. Moreover, the process controller 164 outputs an emergency shutdown signal to the actuator 50 via the fourth input/output 38. The actuator 50 as the output destination of the emergency shutdown signal is a valve of a pipe installed in the production well 90 that supplies a fluid at that point in time. When the emergency shutdown signal is inputted from the process controller 164 into the valve, the valve closes the flow passage completely.

Under the emergency shutdown control, the process controller 164 may output the emergency shutdown signal inputted from the second setting monitor 24 into the second computation task 16, to the valve via the fourth input/output 38. Consequently, when emergency shutdown is instructed in accordance with the user operation, the flow passage is closed.

The start or end of the above-mentioned control may be instructed by the second setting monitor 24. For example, a control start signal is inputted from the second setting monitor 24 into the second computation task 16. At this point in time, the process controller 164 starts control instructed by the control start signal. Alternatively, a control stop signal is inputted from the second setting monitor 24 into the second computation task 16. At this point in time, the process controller 164 stops control instructed by the control stop signal (for example, the flow control or the emergency shutdown control).

Moreover, as in the above-mentioned flow control and emergency shutdown control, a parameter used for control (for example, a control parameter of PID control or the upper limit of the mass flow rate) may be able to be inquired or set by the second setting monitor 24. For example, a parameter query signal is inputted from the second setting monitor 24 into the second computation task 16. At this point in time, the process controller 164 outputs, to the second setting monitor 24, the parameters set therein as of this point in time. Alternatively, a parameter setting signal is inputted from the second setting monitor 24 into the second computation task 16. At this point in time, the process controller 164 changes current values of the parameters instructed by the parameter setting signal to setting values of the instructed parameters.

The access controller 20 uses a predetermined protocol to control access from the operation monitoring terminal apparatus 70 connected to the flow computing apparatus 10 via the third input/output 36 (a security function). The operation monitoring terminal apparatus 70 may be connected to the third input/output 36 via the network NW as illustrated in FIG. 1. Alternatively, the operation monitoring terminal apparatus 70 may be connected directly to the third input/output 36. The access controller 20 may store in advance authentication information including a hashed user ID (Identifier) and password as information for identifying a user to authenticate the user. When the access controller 20 detects a connection between the flow computing apparatus 10 and the operation monitoring terminal apparatus 70, the access controller 20 outputs, to the operation monitoring terminal apparatus 70, login screen data for guiding the input of the user ID and the password. The operation monitoring terminal apparatus 70 displays a login screen indicated by the login screen data received from the access controller 20 and waits for the input of the user operation. The operation monitoring terminal apparatus 70 transmits, to the access controller 20, the user ID and password instructed by the operation input. The access controller 20 hashes the user ID and password received from the operation monitoring terminal apparatus 70. The access controller 20 determines whether or not this pair of the hashed user ID and password (access information) agrees with a pair of a user ID and a password, which is hashed according to the user, included in the stored authentication information. For example, if any of pairs of a user ID and a password included in the authentication information agrees with the access information, the access controller 20 permits access from the operation monitoring terminal apparatus 70 used by the user (user authentication). The access controller 20 then permits the setting of various types of information, or a query (monitoring) of the flow rate or the state of the computation, via the first setting monitor 22 or the second setting monitor 24.

Alternatively, if no pair of a user ID and a password included in the authentication information agrees with the access information, the access controller 20 does not permit access from the operation monitoring terminal apparatus 70 used by the user.

Even if permitting access from the operation monitoring terminal apparatus 70, the access controller 20 restricts a change in at least the function of the first computation task 14. In other words, even if a change is instructed to a part or whole of an application for realizing the function of the first computation task 14 (hereinafter referred to as the "first computing function app") in a normal use state, the first setting monitor 22 rejects the instruction.

However, the access controller 20 detects the presence or absence of a press on the operating device 26. When having detected a press on the operating device 26, the access controller 20 permits, for example, a change in a part or whole of the existing first computing function app inputted from the operation monitoring terminal apparatus 70. The changed part or whole of the first computing function app is installed. Consequently, a function corresponding to the changed part is updated. In this case, the flow computing apparatus 10 is provided as a flow computer to compute a flow rate. In order to achieve this, the user needs to acquire a transaction certification of the authority.

The operation monitoring terminal apparatus 70 inputs an operation signal into the first setting monitor 22 via the third input/output 36. The first setting monitor 22 makes the setting and a query of a parameter set used to calculate a flow rate, and a query (monitoring) of a measurement value or accumulated flow rate).

For example, the operation signal inputted from the operation monitoring terminal apparatus 70 indicates a query of a parameter set used to calculate an accumulated flow rate. At this point in time, the first setting monitor 22 outputs, to the flow rate computer 142, a parameter query signal for instructing a query of a part or all of the parameters. The parameter set is inputted as a response to the parameter query signal from the flow rate computer 142 into the first setting monitor 22. At this point in time, each parameter included in the parameter set inputted is substituted into its corresponding display field on a parameter setting screen A for setting parameters of a flow rate. The first setting monitor 22 outputs, to the operation monitoring terminal apparatus 70, parameter setting data for displaying the parameter setting screen A including the substituted parameters (a parameter query).

Alternatively, the operation signal inputted from the operation monitoring terminal apparatus 70 indicates setting values of a part or all of parameters of a parameter set. At this point in time, the first setting monitor 22 outputs a parameter setting signal indicating the setting values, to the flow rate computer 142 (parameter settings).

For example, the operation signal inputted from the operation monitoring terminal apparatus 70 indicates a query of a measurement value. At this point in time, the first setting monitor 22 outputs a measurement value query signal indicating the query to the flow rate computer 142. A measurement value is then inputted as a response to the measurement value query signal from the flow rate computer 142 into the first setting monitor 22. At this point in time, the first setting monitor 22 generates a measurement value display screen indicating an inputted measurement value, and outputs, to the operation monitoring terminal apparatus 70, measurement value display data indicating the generated measurement value display screen (a measurement value query). The operation monitoring terminal apparatus 70 displays the measurement value display screen based on the measurement value display data inputted from the first setting monitor 22.

Alternatively, the operation signal inputted from the operation monitoring terminal apparatus 70 indicates a query of an accumulated flow rate. At this point in time, the first setting monitor 22 outputs a flow rate query signal indicating the query to the flow rate computer 142. The accumulated flow rate is then inputted as a response to the flow rate query signal from the flow rate computer 142 into the first setting monitor 22. At this point in time, the first setting monitor 22 generates a flow rate display screen indicating the inputted accumulated flow rate, and outputs, to the operation monitoring terminal apparatus 70, flow rate display data indicating the generated flow rate display screen (a flow rate query). The operation monitoring terminal apparatus 70 displays the flow rate display screen based on the flow rate display data inputted from the first setting monitor 22.

For example, abnormal value information is inputted from the flow rate computer 142 into the first setting monitor 22. At this point in time, the first setting monitor 22 generates an abnormal value display screen indicating the inputted abnormal value. The first setting monitor 22 then outputs abnormal value display data indicating the generated abnormal value display screen to the operation monitoring terminal apparatus 70 (an abnormal value display). The operation monitoring terminal apparatus 70 displays the abnormal value display screen based on the abnormal value display data inputted from the first setting monitor 22.

The operation signal is inputted from the operation monitoring terminal apparatus 70 into the second setting monitor 24 via the third input/output 36. The second setting monitor 24 makes the setting and a query of a parameter set used to calculate a management index or control a process, and a query of the management index.

For example, the operation signal inputted from the operation monitoring terminal apparatus 70 indicates a query of a parameter set used to calculate a management index. At this point in time, the second setting monitor 24 outputs, to the management index computer 162, a parameter query signal for instructing the query. The parameter set is then inputted as a response to the parameter query signal from the management index computer 162 into the second setting monitor 24. At this point in time, each parameter included in the inputted parameter set inputted is substituted into its corresponding display field on a parameter setting screen B for setting parameters of a management index.

For example, the operation signal inputted from the operation monitoring terminal apparatus 70 indicates a query of a parameter set used to control a process. At this point in time, the second setting monitor 24 outputs, to the process controller 164, a parameter query signal for instructing the query. The parameter set is then inputted as a response to the parameter query signal from the process controller 164 into the second setting monitor 24. At this point in time, the second setting monitor 24 substitutes each parameter included in the inputted parameter set into its corresponding display field on the above-mentioned parameter setting screen B.

The second setting monitor 24 outputs, to the operation monitoring terminal apparatus 70, parameter setting data for displaying the parameter setting screen B including the substituted parameters (a parameter query).

For example, the operation signal inputted from the operation monitoring terminal apparatus 70 indicates setting values of a part or all of parameters of a parameter set used to calculate a management index. At this point in time, the second setting monitor 24 outputs a parameter setting signal indicating the setting values to the management index computer 162.

Alternatively, the operation signal inputted from the operation monitoring terminal apparatus 70 indicates setting values of a part or all of parameters of a parameter set used to control a process. At this point in time, a parameter setting signal indicating the setting values is outputted to the process controller 164 (parameter settings).

For example, the operation signal inputted from the operation monitoring terminal apparatus 70 indicates a query of a management index. At this point in time, the second setting monitor 24 outputs a management index query signal indicating the query to the management index computer 162. A management index is then inputted as a response to the management index query signal from the management index computer 162 into the second setting monitor 24. At this point in time, the second setting monitor 24 generates a management index display screen indicating the inputted management index, and outputs, to the operation monitoring terminal apparatus 70, management index display data indicating the generated management index display screen (a flow rate query). The operation monitoring terminal apparatus 70 displays the management index display screen based on the management index display data inputted from the first setting monitor 22.

Moreover, the second setting monitor 24 may control the operation of the second computation task 16 on the basis of the operation signal inputted from the operation monitoring terminal apparatus 70.

For example, the operation signal inputted from the operation monitoring terminal apparatus 70 indicates the production well 90 being a switching destination. At this point in time, the second setting monitor 24 outputs, to the process controller 164, a switching control signal indicating a switch to the production well 90 (production well switching).

Alternatively, the operation signal inputted from the operation monitoring terminal apparatus 70 indicates emergency shutdown. At this point in time, the second setting monitor 24 outputs an emergency shutdown signal indicating emergency shutdown to the process controller 164.

Alternatively, the operation signal inputted form the operation monitoring terminal apparatus 70 indicates the start of process control. At this point in time, the second setting monitor 24 outputs, to the process controller 164, a control start signal indicating the start of control instructed by the operation signal.

Alternatively, the operation signal inputted from the operation monitoring terminal apparatus 70 indicates the stop of process control. At this point in time, the second setting monitor 24 outputs, to the process controller 164, a control stop signal indicating the stop of control instructed by the operation signal (emergency shutdown).

Moreover, the second setting monitor 24 may edit an application that is executed by the second computation task 16 on the basis of the operation signal inputted from the operation monitoring terminal apparatus 70. "Editing" here indicates generation, change of a part or all, or deletion of a part or all. The second setting monitor 24 may install the edited application on the second computation task 16. The installed application may be executed by the second setting monitor 24 as an application for realizing a part of one or both of the functions of the management index computer 162 and the process controller 164. Alternatively, the application may be executed as a separate application by the second setting monitor 24. Therefore, the acquisition of a management index useful to manage the flow rate, and the addition or change of a function related to control are permitted by the access controller 20. On the other hand, the function related to the basic flow rate computation is protected.

The parameter setting screen A for setting parameters of a flow rate, and the parameter setting screen B for setting parameters of a management index may have a common display format. The display format indicates elements forming an impression given to a user who views, such as the size and position of the entire screen, and the size and color of characters, or a combination thereof.

Moreover, the measurement value display screen, the flow rate display screen, or the management index display screen may have a common display format. These setting screens and display screens may have a predetermined data format (for example, the HTML (Hypertext Modeling Language) format). Consequently, the user can, for example, set parameters or monitor computed values without paying attention to a difference between the flow rate computation and the management index computation, while viewing the screen in the unified format. Hence, the efficiency of these works is improved. However, the display format of the abnormal value display screen may be significantly different from the display format of the measurement value display screen, the flow rate display screen, and the management index display screen. This is to cause the user to easily recognize the occurrence of an abnormal condition.

Furthermore, the first setting monitor 22 and the second setting monitor 24 may be realized as webservers that provide the above-mentioned information, using a predetermined communication protocol (for example, http (Hypertext Transfer Protocol)) for a web browser that is executed by the operation monitoring terminal apparatus 70. In other words, the operation monitoring terminal apparatus 70 can access these pieces of information as long as having the function of a web browser. Hence, the operation monitoring terminal apparatus 70 is provided with a user interface for providing or setting various types of information irrespective of an execution environment such as an operating system (OS).

Figure 3:
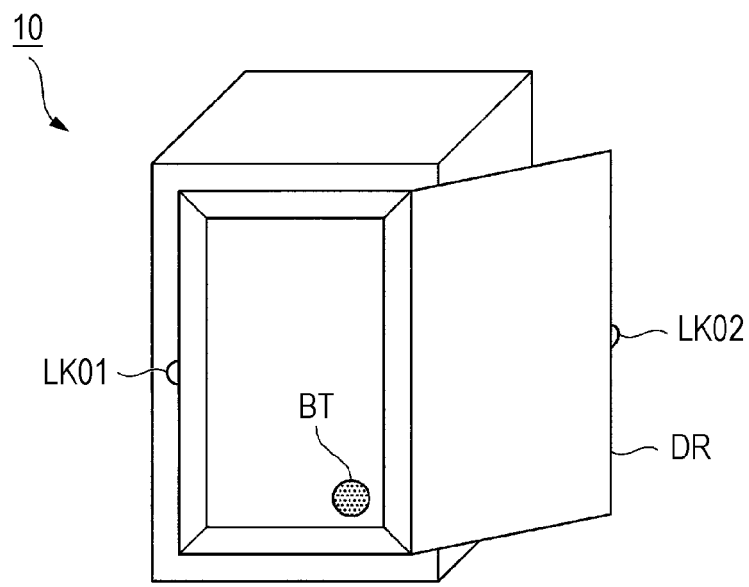
FIG. 3 is a diagram illustrating an example of the external configuration of the flow computing apparatus according to one or more embodiments of the present invention.

The operating device 26 is installed in a housing of the flow computing apparatus 10. The operating device 26 includes a physical member that accepts the user operation, for example, a button. For example, FIG. 3 illustrates a button BT as an example of the operating device 26. The button BT is placed in a position where the user can touch when a door DR installed on a surface of the housing of the flow computing apparatus 10 is open. In a state where the door DR is closed, the button BT is covered by the door DR. Hence, the user cannot touch the button BT. The door DR can be locked when closed. In the example illustrated in FIG. 3, one side of the door DR is a fixed end fixed to the housing of the flow computing apparatus 10. The door DR is rotatable about the fixed end. A side facing the fixed end is an open end. Mounting portions LK01 and LK02 are mounted on a center portion of the open end of the door DR and the housing. The mounting portions LK01 and LK02 each include an annular ring portion. When the door DR is closed, these annular rings are mounted in positions and orientations where the annular ring portions overlap each other. In this state, a latch of the lock is coupled to the annular ring portions of the mounting portions LK01 and LK02. When the lock is engaged, the latch of the lock is in intimate contact with the main body. When the flow computing apparatus 10 is in practical use, the latch in intimate contact with the main body is sealed. In other words, when the lock is disengaged, the seal is broken. Hence, whether or not the seal is unlocked is easily detected.

The housing door, the mounting portions, and a key are made of a member having high resistance to deformation and destruction due to external force, for example, stainless.

In the example described above, the key is used as a closure that restricts the opening of the door DR to close the housing. However, the closure is not limited to the key. Instead of the key, a wire seal may be used. In this case, a metal wire is inserted into the annular ring portions of the mounting portions LK01 and LK02. Both ends of the wire are coupled by the wire seal. The wire is cut with a tool such as a pair of pliers to open the door DR.

Moreover, in the above-mentioned example, the button BT is used as a member that accepts the user operation. However, instead of the button BT, or together with the button BT, a member such as a knob or dial may be used.

In the FIG. 2, the first input/output 32, the second input/output 34, the third input/output 36, and the fourth input/output 38 input and output various types of data to and from the computation controller 12 and the outside of the flow computing apparatus 10, as described above. The sensor data A and B are mainly inputted from the sensors 40 and 45 into the first input/output 32. The second input/output 34 mainly outputs transaction information and management index information to the management server apparatus 80. The operation signal is mainly inputted from the operation monitoring terminal apparatus 70 into the third input/output 36. Moreover, the third input/output 36 outputs various types of screen information and other information. The fourth input/output 38 mainly outputs various control signals to the actuator 50. The first input/output 32, the second input/output 34, the third input/output 36, and the fourth input/output 38 each include an input/output interface or communication interface. The first input/output 32, the second input/output 34, the third input/output 36, and the fourth input/output 38 are each connected to its input/output destination in such a manner as to be capable of inputting and outputting a signal or data. This connection may be wired or wireless. Moreover, each group including two or more of the first input/output 32, the second input/output 34, the third input/output 36, and the fourth input/output 38 may configure a single input/output.

As described above, the flow computing apparatus 10 according to one or more embodiments includes the first computation task 14 and the second computation task 16. The first computation task 14 includes the flow rate computer 142 that computes the flow rate of a fluid from sensor data indicating the state of the fluid, and the transaction information generator 144 that generates transaction information indicating the flow rate of the fluid. The second computation task 16 includes the management index computer 162 that computes a management index related to the supply of the fluid. The management index is computed on the basis of at least a part of sensor data or index values computed during the course of computing a flow rate. The flow computing apparatus 10 includes the access controller 20 that restricts a change in at least the function of the first computation task 14.

In other words, changes in the functions of the flow rate computer 142 and the transaction information generator 144, which are included in the first computation task 14, are restricted. Hence, the predetermined requirements for fluid transactions can be satisfied. In addition, a management index of a fluid can be computed. Consequently, the number of computing apparatuses installed on a fluid production site or commercial site can be reduced. This contributes to the simplification of the network configuration among the devices. Hence, the maintenance efficiency of the fluid flow management is improved.

Moreover, in the computation of a management index, a part of sensor data or index values computed during the course of computing a flow rate is used. Hence, there is no need to acquire the sensor data separately. Furthermore, there is also no need to compute an index value redundantly. Hence, effective use of a computation result is promoted, and also the necessity of synchronization among the devices is eliminated.

Moreover, the access controller 20 restricts a change in setting information on the computation of a fluid flow rate based on the operation of an authenticated user. Furthermore, the access controller 20 restricts a change in a program for causing the first computation task 14 to execute a process.

With this configuration, the users who can change the setting information on the computation of a flow rate are limited to users registered in advance. Hence, the function of the first computation task 14 is maintained. Hence, the requirements for fluid transactions are further maintained.

Moreover, the flow computing apparatus 10 includes the door that covers the surface of the housing and can be locked, and the operating device 26 inside the housing. When the access controller 20 detects a press on the operating device 26, the access controller 20 permits a change in the program for causing the first computation task 14 to execute a process.

With this configuration, the user unlocks the door. Furthermore, unless the operating device 26 is pressed down, the function of the first computation task 14 does not change. Hence, the requirements for fluid transactions are further maintained.

Moreover, when the setting information on the computation of a flow rate is uprated, the transaction information generator 144 generates an update record of the setting information.

With this configuration, an update record of the setting information is generated as information that influences a computation result of the flow rate. Hence, in terms of the destination to provide the fluid, the validity of the computed flow rate can be verified by the update record.

Moreover, the flow computing apparatus 10 presents the setting screen having the common format to the setting screen of the setting information on the computation of a flow rate. The flow computing apparatus 10 includes the second setting monitor 24 that determines the setting information on the computation of a management index in accordance with the user operation.

With this configuration, the user can determine the setting information on the computation of a management index while viewing the setting screen having the common format to the setting screen related to the computation of a flow rate. Hence, when determining the setting information, the user can make the setting of information that is generally made separately, at a time without paying attention to a difference between the flow rate and the management index as the index values targeted for computation. Hence, the work efficiency of the maintenance management is improved.

Moreover, the second setting monitor 24 edits a program for causing the second computation task 16 to make a computation, in accordance with the user operation.

With this configuration, the predetermined requirements for fluid transactions can be satisfied. In addition, the user can arbitrarily add or change the function related to fluid transactions.

Moreover, the second computation task 16 includes the process controller 164 that computes the operation amount of the process related to the supply of a fluid on the basis of at least a part of sensor data.

With this configuration, there is no need to provide a control device separately to control the process. Hence, the network configuration among the devices is further simplified. The effort of the maintenance management of the entire system is reduced.

Moreover, the flow computing apparatus 10 includes a transmitter (for example, the second input/output 34) that transmits a fluid flow rate and a management index to a common transmission destination (for example, the management server apparatus 80).

With this configuration, a fluid flow rate and a management index, which are generally transmitted separately, are transmitted to a common transmission destination. Hence, the network configuration related to the transmission of data is simplified. Hence, the effort of the maintenance management of the entire system is reduced.

Up to this point the embodiments have been described with reference to the drawings. However, the specific configuration is not limited to the above-mentioned configuration. Various design changes and the like can be made within the scope that does not depart from the gist of the embodiments of the present invention.

For example, the computation controller 12 may allocate computation resources in such a manner as to give a higher priority to the function of the first computation task 14 than the second computation task 16 and process the function. For example, a total of a computation amount A required by the first computation task 14, and a computation amount B required for the other processes in the computation controller 12 may exceed an upper limit of the computation amount permitted by the computation controller 12. At this point in time, the computation controller 12 allocates the computation amount A to the first computation task 14, and allocates the remaining computation amount to the other processes.

FIG. 2 illustrates an example where the computation controller 12 includes one computing device as hardware. However, the computation controller 12 is not limited to this example. The computation controller 12 may include two or more computing devices. Of these computing devices, at least one computing device (a computing device A) may be used exclusively as the first computation task 14. At this point in time, the other device (a computing device B) is used to realize the remaining functions. In the computing device A, the change, generation, and deletion of an application installed therein is restricted. On the other hand, in the computing device B, the change, generation, and deletion of an application installed therein is permitted.

Moreover, the flow computing apparatus 10 may include both of a rewritable storage medium and a non-rewritable storage medium (for example, a mask ROM (Read Only Memory)), as storage media. Of them, the first computing function app that realizes the function of the first computation task 14 may be stored in the non-rewritable storage medium. An application, various parameter sets, and other data for realizing the function of the second computation task 16 may be stored in the rewritable storage medium.

Figure 4:
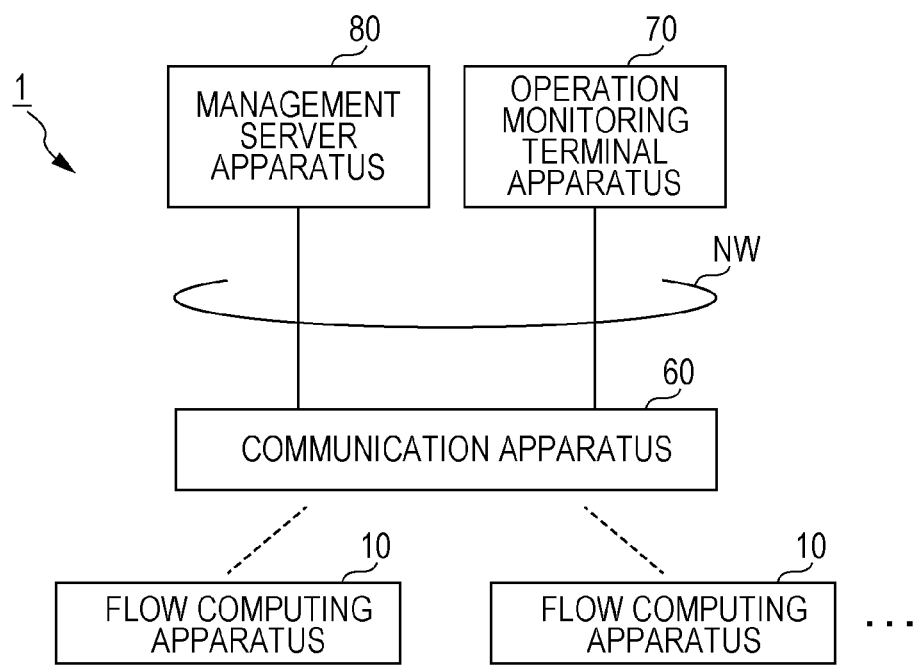
FIG. 4 is a block diagram illustrating another example of the flow management system according to one or more embodiments of the present invention.

In the above description, the example of the case where the flow management system 1 includes one flow computing apparatus 10 is described. However, the number of the flow computing apparatuses 10 is not limited to this example. As illustrated in FIG. 4, the flow management system 1 may include a plurality of the flow computing apparatuses 10 that operates independently of each other. Each of the flow computing apparatuses 10 may calculate the flow rate of its corresponding production well of a plurality of the production wells 90. In the flow management system 1, one operation monitoring terminal apparatus 70 and one management server apparatus 80 are used to enable the centralized execution of, for example, state monitoring, parameter settings, query, or application edition of each of the plurality of fluids.

Moreover, in the example illustrated in FIG. 4, the plurality of the flow computing apparatuses 10 is all connected to one communication apparatus 60. However, the number of the communication apparatuses 60 is not limited this example. The plurality of the flow computing apparatuses 10 may be connected to the network NW via different communication apparatuses 60, respectively. Moreover, only a part of them, two or more flow computing apparatuses 10, may be connected to the one communication apparatus 60. At this point in time, the remaining flow computing apparatuses 10 may be connected to their corresponding communication apparatuses 60.

As described above, a part of the flow computing apparatus 10, for example, the first computation task 14, the second computation task 16, the access controller 20, the first setting monitor 22, and the second setting monitor 24, may be realized by a computer. In this case, a program to realize this control function may be recorded in a computer-readable recording medium. The program recorded in the recording medium is read into a computer system. The read program is then executed by a computation processing circuit such as a CPU. Consequently, the control function is realized. The "computer system" here is built in the flow computing apparatus 10, and includes an OS and hardware such as a peripheral device. Moreover, the "computer-readable recording medium" indicates portable media such as a flexible disk, a magneto-optical disk, a ROM, and a CD-ROM, and storage devices such as a hard disk built in the computer system. Furthermore, the "computer-readable recording medium" may include a recording medium that dynamically holds a program for a short time as in a communication line for transmitting a program via a communication circuit such a network, for example, the Internet, or a telephone line. Furthermore, a recording medium that holds a program for a fixed time, like a volatile memory inside the computer system as a server or client in this case, may be included. Moreover, the program may be a program for realizing a part of the above-mentioned functions. Furthermore, the program may be able to realize the above-mentioned functions in combination with other programs already recorded in the computer system.

Moreover, a part of the flow computing apparatus 10 may be realized as an integrated circuit such as a LSI (Large Scale Integration). The function blocks of the flow computing apparatus 10 may configure processors individually. Alternatively, a part of the function blocks may be integrated to configure a processor. Moreover, a method for an integrated circuit may be realized by not limited to an LSI but a dedicated circuit or a general-purpose processor. Moreover, if an integrated circuit technology that is replaced by an LSI with the advance of the semiconductor technology appears, an integrated circuit based on the technology may be used.

The flow computing apparatus according to one or more embodiments may be the following first to eighth flow computing apparatuses.

The first flow computing apparatus includes: a first computation task having a flow rate computer configured to compute a flow rate of a fluid from sensor data indicating a state of the fluid, and a transaction information generator configured to generate transaction information indicating the flow rate of the fluid; a second computation task having a management index computer configured to compute a management index related to supply of the fluid on the basis of at least a part of the sensor data or index values computed during the course of computing the flow rate of the fluid; and an access controller configured to restrict at least a change in a function of the first computation task.

The second flow computing apparatus is the first flow computing apparatus in which the access controller restricts a change in setting information on the computation of the flow rate of the fluid on the basis of an operation of an authenticated user, and restricts a change in a program for causing the first computation task to execute a process.

The third flow computing apparatus is the second flow computing apparatus including: a door covering a surface of a housing; and an operating device inside the housing, in which the door is capable of mounting thereon a closure that restricts opening of the door, and the access controller permits a change in the program upon detecting an operation on the operating device.

The fourth flow computing apparatus is the second or third flow computing apparatus in which the transaction information generator generates an update record of the setting information on the computation of the flow rate upon the setting information being updated.

The fifth flow computing apparatus is any of the second to fourth flow computing apparatuses including a setting monitor configured to present a setting screen having a common format to a setting screen of the setting information on the computation of the flow rate, and determine setting information on the computation of the management index in accordance with the operation.

The sixth flow computing apparatus is the fifth flow computing apparatus in which the setting monitor edits a program for causing the second computation task to make a computation in accordance with an operation of the user.

The seventh flow computing apparatus is any of the first to sixth flow computing apparatuses in which the second computation task has a process controller configured to compute an operation amount of a process related to the supply of the fluid on the basis of at least a part of the sensor data.

The eighth flow computing apparatus is any of the first to seventh flow computing apparatuses including a transmitter configured to transmit the flow rate of the fluid and the management index to a common transmission destination.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A flow computing apparatus comprising:
a first computation controller that functions as a flow computer, computes a flow rate of a fluid from sensor data indicating a state of the fluid, and generates transaction information indicating the flow rate of the fluid based on which a transaction price is calculated;
a second computation controller that functions as an allocation metering, and computes a management index that is not used for calculating the transaction price and is related to supply of the fluid based on at least a part of the sensor data or index values computed during a computation of the flow rate of the fluid by the first computation controller; and
an access controller that restricts at least a change in a function of the first computation controller.

2. The flow computing apparatus according to claim 1, wherein
the access controller:
restricts a change in setting information on the computation of the flow rate of the fluid based on an operation of an authenticated user; and
restricts a change in a program that causes the first computation controller to execute a process.

3. The flow computing apparatus according to claim 2, further comprising:
a door that covers a surface of a housing; and
an operating device inside the housing, wherein
a closure that restricts opening of the door is mountable on the door, and
the access controller permits the change in the program upon detecting an operation on the operating device.

4. The flow computing apparatus according to claim 2, wherein the first computation controller generates an update record of the setting information on the computation of the flow rate of the fluid upon the setting information being updated.

5. The flow computing apparatus according to claim 2, further comprising:
a setting monitor that presents a setting screen having a display format in common with a setting screen of the setting information on the computation of the flow rate of the fluid, and determines setting information on the computation of the management index.

6. The flow computing apparatus according to claim 5, wherein the setting monitor edits a program that causes the second computation controller to make a computation in accordance with an operation of the authenticated user.

7. The flow computing apparatus according to claim 1, wherein the second computation controller computes an operation amount of a process related to the supply of the fluid based on at least a part of the sensor data.

8. The flow computing apparatus according to claim 1, further comprising:
a transmitter that transmits the flow rate of the fluid and the management index to a common transmission destination.

* * * * *